United States Patent
Ranjekar

(10) Patent No.: US 10,439,898 B2
(45) Date of Patent: Oct. 8, 2019

(54) MEASURING AFFINITY BANDS FOR PRO-ACTIVE PERFORMANCE MANAGEMENT

(71) Applicant: Infosys Limited, Bangalore (IN)

(72) Inventor: Abhijit S Ranjekar, Pune (IN)

(73) Assignee: Infosys Limited, Bangalore (IN)

(*) Notice: Subject to any disclaimer, the term of this patent is extended or adjusted under 35 U.S.C. 154(b) by 578 days.

(21) Appl. No.: 14/971,790

(22) Filed: Dec. 16, 2015

(65) Prior Publication Data
US 2016/0182333 A1    Jun. 23, 2016

(30) Foreign Application Priority Data
Dec. 19, 2014    (IN) .......................... 6395/CHE/2014

(51) Int. Cl.
 H04L 12/26    (2006.01)
 H04L 12/24    (2006.01)

(52) U.S. Cl.
 CPC ........ *H04L 41/5009* (2013.01); *H04L 41/142* (2013.01); *H04L 43/16* (2013.01)

(58) Field of Classification Search
 CPC ............... H04L 41/5009; H04L 41/142; H04L 41/5016; H04L 43/0876; H04L 63/1425; G06F 11/34; G06F 11/3452; G06F 11/3409; G06F 11/3495; G06F 11/3442; G06Q 10/0639
 See application file for complete search history.

(56) References Cited

U.S. PATENT DOCUMENTS

| | | | |
|---|---|---|---|
| 7,058,704 B1 | 6/2006 | Mangipudi et al. | |
| 7,693,996 B2 | 4/2010 | Wexler et al. | |
| 8,001,094 B2 | 8/2011 | Machida et al. | |
| 8,005,644 B1 * | 8/2011 | Evans ................. | G06F 11/3495 702/122 |
| 8,326,660 B2 | 12/2012 | Breitgand et al. | |

(Continued)

OTHER PUBLICATIONS

Bruno Abrahao et al., "Self-Adaptive SLA-Driven Capacity Management for Internet Services".
(Continued)

*Primary Examiner* — Vivek Srivastava
*Assistant Examiner* — Muhammad Raza
(74) *Attorney, Agent, or Firm* — Klarquist Sparkman LLP

(57) ABSTRACT

A computer implemented system and method for pro-active application monitoring and alerting using affinity band. To enable pro-active monitoring, the present invention may derive affinity band. The invention accesses performance data generated from monitoring an application associated with one or more transaction and configuring iteration period to derive affinity band. The method provides configuring an interval within iteration period whereby all performance metric values may be aggregated and deriving affinity band for each of the performance metrics. The affinity band may then be used as benchmark or threshold to monitor current values for each of the performance metrics. Alerts may be raised through pro-active monitoring mechanism when the current values of the performance metric go beyond the threshold set, displaying a tendency to rise or go beyond normal values with extent of deviation.

20 Claims, 11 Drawing Sheets

(56) References Cited

U.S. PATENT DOCUMENTS

| | | | | |
|---|---|---|---|---|
| 8,949,677 B1* | 2/2015 | Brundage | ........... | G06F 11/0745 |
| | | | | 714/48 |
| 9,614,742 B1* | 4/2017 | Zhang | ................. | H04L 43/0823 |
| 9,628,499 B1* | 4/2017 | Yu | ...................... | H04L 63/1416 |
| 2006/0235827 A1* | 10/2006 | Walsh | ................ | G06F 11/0709 |
| 2009/0271511 A1* | 10/2009 | Peracha | ............. | G06F 11/3419 |
| | | | | 709/224 |
| 2011/0098973 A1* | 4/2011 | Seidman | ............ | G06F 11/0709 |
| | | | | 702/179 |
| 2013/0081035 A1* | 3/2013 | Nardelli | ............. | G06F 11/3419 |
| | | | | 718/102 |
| 2013/0116976 A1* | 5/2013 | Kanemasa | .......... | G06F 11/3419 |
| | | | | 702/186 |
| 2013/0158950 A1* | 6/2013 | Cohen | .................... | G06F 17/00 |
| | | | | 702/176 |
| 2015/0269050 A1* | 9/2015 | Filimonov | ......... | G06F 11/3409 |
| | | | | 702/183 |
| 2016/0164721 A1* | 6/2016 | Zhang | .................. | H04L 41/142 |
| | | | | 709/224 |

OTHER PUBLICATIONS

Songyun Duan et al., "Proactive Identification of Performance Problems", Duke University.

* cited by examiner

MEASURING AFFINITY BANDS FOR PRO-ACTIVE PERFORMANCE MANAGEMENT

This application claims priority to India Patent Application No. 6395/CHE/2014, filed Dec. 19, 2014, the disclosure of which is hereby incorporated by reference in its entirety.

FIELD OF TECHNOLOGY

This disclosure relates generally to the field of application performance management, and more particularly to a computer-implemented method and system for pro-active performance management of a software application.

BACKGROUND

The growing presence of Internet and other computer networks such as intranets and extranets has brought about the development of applications in e-commerce, banking-finance, healthcare, manufacturing, telecom and other areas. Organizations increasingly rely on the applications to carry out business, and commit considerable resources for ensuring that the applications perform as expected. To this end, various application management techniques have been developed.

One approach for managing performance, stability, and throughput of application involves monitoring the application, generating data regarding application performance and analyzing the data to determine the application's health. Performance management products analyze a large number of data streams trying to determine a normal and abnormal application state. The large volume of data streams may be difficult to analyze as the performance management products fail to have a semantic understanding of data being analyzed. Accordingly, when an unhealthy application state occurs, many data streams may have abnormal data values because the data streams may be causally related to one another. Since the performance management products lack a semantic understanding of the data, they fail to assist a user in determining either the source or the cause of a problem. Performance management systems fail to know under what conditions a set of data was obtained, making it even more difficult to identify whether there is truly a problem with the application.

The rate of flow of data in computer networks between hosts and clients in internets and intranets depends upon parameters such as throughputs, queue length, resource consumption, database (DB) characteristics. Some of these parameters may be tied to the provision of resources. These provisioned resources may be measured and audit reports may be generated to see if the parameters fall in the range of negotiated service level agreement (SLA). The service level agreement between a service-provider and the user may define the expected and acceptable properties of the services. The SLA provides a tool by which performance goals may be measured by defining performance metrics and corresponding goals. By monitoring compliance with SLA limits, the service provider may avoid unexpected problems that result from disappointing users or hosted customers.

SUMMARY

The embodiments assign affinity mean and affinity band, i.e. ranges of values around which the response times may tend to aggregate. The affinity band and affinity mean may be the value around which the response times may tend to cluster. The affinity band may define the normal-ness of the response time values and allows alerting pro-actively before the overall average shows any changes and/or trends. The affinity band also leads to benchmarking and allows comparison of the response time behavior when there may be any change in the application. The current practices of using normal averages or mean values and/or 90th percentiles fail to provide the real value around which the response times may tend to assume values because extreme values pull the averages in either direction. Using normal averages to measure the quantum of change may be deceptive because relying on single numerical computation may not provide comprehensive evaluation. Further, averages fail to provide pro-active performance management since there may be significant instances of the response times beyond simple average. The affinity band and affinity mean may be used to derive the threshold and/or SLA for the response time of transaction. Accordingly, the embodiments cause computers and computer systems to operate more efficiently.

The embodiments enable pro-active performance monitoring and alerting based on changes beyond threshold. Pro-active in the current context may mean controlling a situation well in advance to deal with an expected difficulty rather than just reacting to the situation after it has happened. The embodiments allow SLAs to be set for large number of transactions in an automated manner. The embodiments also enable benchmarks to be set in view of changes, forthcoming releases to compare the new response times and determine delta change. The aforementioned methodology may be integrated with existing monitoring solutions and/or products to set appropriate alert, provide benchmark reports and headroom for SLAs thus enhancing the application performance management for multitude of transactions.

In accordance with one embodiment, there is provided a system and method for pro-active application monitoring and alerting using affinity band. To enable pro-active monitoring, the present invention may derive affinity band. The embodiment accesses performance data generated from monitoring an application associated with one or more transaction and configuring iteration period to derive affinity band. Furthermore, the method provides configuring an interval within iteration period where all performance metric values may be aggregated. The affinity band for each of the performance metrics may be derived. The affinity band may be used as benchmark or threshold to monitor current values for each of the performance metrics. Alerts may be raised through pro-active monitoring mechanism when the current values of the performance metric go beyond the threshold set. The method displays a tendency to rise or go beyond normal values with extent of deviation.

In another embodiment, the user may be provided with an early indication of upward movement and comparison to reveal change characteristics when the application changes.

In yet another embodiment, the invention may be integrated with existing monitoring solutions and products to set appropriate alerts, provide benchmark reports and configuring SLAs.

In one embodiment, the invention may be used to derive other performance parameters such as throughputs, queue length, resource consumption, DB characteristics and availability parameters.

In another embodiment, the invention may be applied in application performance monitoring tools, non-functional requirement relating to response time and volume, benchmarking performance, performance comparison across releases and/or changes, and pro-active application performance management.

In yet another embodiment, the invention may enhance business intelligence provided by monitoring tools, enable SLAs to be set for large number of transactions in automated manner and derive threshold and/or SLA for response time of the transaction.

In one embodiment, the consulting system supports hosted or in premise based solution. The consulting system automates the activity by reducing the time taken in consultation.

BRIEF DESCRIPTION OF THE DRAWINGS

Example embodiments are illustrated by way of example and not limitation in the figures of the accompanying drawings, in which like references indicate similar elements and in which.

Figure 1:
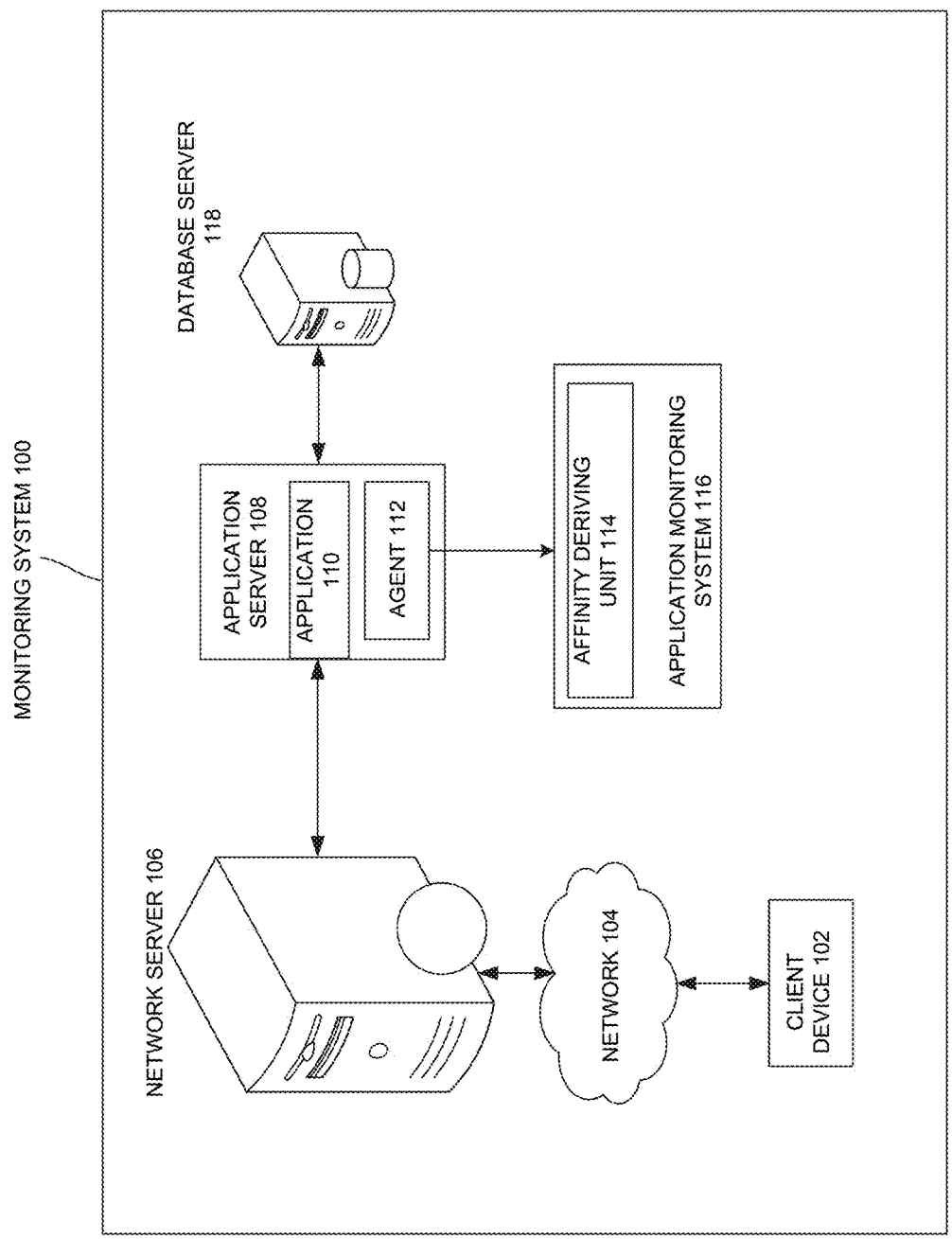
FIG. 1 shows consulting system, according to one or more embodiments.

Other features of the present embodiments may be apparent from the accompanying drawings and from the detailed description that follows.

DETAILED DESCRIPTION

The proposed invention may provide the view on how the response times may be distributed, what value they may tend to assume, when alerting for responses rising may be set, how to best compare responses across changes etc. The invention may add value into business intelligence/analytics provided by the monitoring tools. Moreover, these values may be used to set SLAs, define non-functional requirements around the response times, volumes and allow pro-active performance management for transactions rather than selecting few due to inability to define norms otherwise.

Existing tools/mechanisms lack next level of inputs such as affinity band and affinity mean derived using procedures described below. While the application performance management tools have provision for alerting and locating the performance degradation i.e. thresholds to identify deviation from normal, making the tool effective. The invention described here may lead to arriving at the thresholds in automated manner. The invention converts the performance data into health indicator by bringing out the boundary zone and thus can be used to cause computers to operate more efficiently.

Currently business assigns thresholds and/or SLAs for critical transactions. The SLA assignment may be done based on thumb rule and experience, and assignment to few transactions. Performance monitoring may be done based on SLAs assigned. SLAs may be associated with business critical transactions whereas the actual number of transactions for the application may be too large.

It may be difficult to assign some random value of threshold and/or SLA for the business critical transactions as the number of such transactions may be large and may fail to validate the threshold assigned. Even in case of the business critical transactions that have SLAs assigned, alerts may be raised only after the SLA may be breached and early determination of responses rising upwards may be difficult.

Alerting based on the response time monitoring may be possible for the transactions that have well defined SLAs. Since the alerting may be done post SLA breach, the solution may fail to be pro-active. The transactions lacking SLAs assigned, may fail to identify performance degradation due to absence of appropriate alerting mechanism. Since, the SLAs may be assigned manually, validation may be inappropriate and the exercise may put restriction on number of transactions that may be studied and assigned SLAs. Thus, there may be a need for pro-active application performance monitoring and alerting based on changes beyond threshold.

Application health may be determined by calculating a baseline deviation for one or more transactions. The baseline may be determined for one or more transaction metrics derived from the performance data having a context. The performance data may be generated in response to monitoring one or more applications that perform the transactions during a time period associated with the context. The performance data may include transaction metric data and context data describing conditions under which one or more transactions may be performed.

A baseline may be determined by processing the performance data associated with each transaction metric and the context in which the transaction was performed. Baseline data may include predicted or expected transaction metric values. The baseline data may be compared to a time series of actual metric values for the transaction in the same or similar context. Based on the comparison for the baseline data having the same or similar context, a deviation from the baseline value may be determined for the transaction metric and reported to the user through an interface. Determining a baseline for transactions metric using the performance data having the same context may allow for more accurate prediction of the performance metric values and more reliable determinations of whether the application or transaction may be performing as expected.

The context may be transaction type specific and may indicate information about the transaction for a particular time period. For example, context data may include error rate, throughput and concurrency experienced for a particular transaction during the time period. The time period may be a set time period such as 10 seconds, 15 seconds, 30 seconds. The time period may be a series of non-overlapping period or time window, overlapping windows, and/or some other variation of time window.

In one or more embodiments, the baseline deviation may be expressed in terms of the transaction, business application, and/or some other computer process. The transaction may be a set of operations performed to process a request received by the application. The operations may be performed by application components, such as enterprise java beans, servlets and other components, and computer processes invoked by the components, such as backend database and/or other process or system. The business application may be a set of transactions defined by the user. The performance metric may be a performance indicator for the transaction, such as response time or average response time, or some other measurable quantity associated with the transaction performed in response to the request. The request may be a real customer request or a synthetic request.

FIG. 1 shows block diagram depicting one embodiment of a system for determining transaction performance and resource usage. The block diagram of FIG. 1 includes client device 102, network 104, network server 106, application server 108, application monitoring system 116 and database server 118. Client device 102 and network server 106 communicate over network 104, which may be implemented as a private or public network, the Internet, an intranet, or some other network. A number of client devices may communicate with the network server 106 over network 104 and any number of servers or other computing devices which may be connected in any configuration may be used.

The network server 106 may provide a network service to the client device 102 over the network 104. The application server 108 may be in communication with network server 106, but may also be connected over one or more networks. When the network server 106 receives a request from client device 102, network server 106 may relay the request to the application server 108 for processing. The client device 102 may be a laptop, PC, workstation, cell phone, PDA, and/or other computing device operated by an end user. The client device 102 may also be an automated computing device such as server. The application server 108 processes the request received from network server 106 and sends a corresponding response to the client device 102 via the network server 106. In one or more embodiments, the application server 108 may send the request to the database server 118 as part of processing the request received from the network server 140. The database server 118 may provide a database or some other backend service and process requests from the application server 108.

The client device 102 may be implemented as a server, computing device and/or some other machine that sends the request to the network server 106. The network server 106 may provide a network service to the client device 102 over the network 104. In one or more embodiments, the network server 106 may be implemented as a web server and implement a web service over the Internet. The network server 106 may receive the request from the client device 102, process the request and send the response to the client device 102. In processing the requests, the network server 106 may invoke the application 110 on application server 108. The invoked application 110 may process the request, provide the response to the network server 106, and the network server 106 may provide the corresponding response to the client device 102.

The application server 108 includes application 110, and agent 112. Though not illustrated in FIG. 1, application server 108 may contain more or less than two applications and any application may be monitored by agent 112 or another agent. Application 110 may process request received from the network server 106. In one or more embodiments, application 110 may process the request by receiving the request, generating the response and sending the response to the network server 106. In one or more embodiments, generating the response by the application may include sending the request to database server 118. Application response may then generated based on the response received from the invoked database server 118. The agent 112 may generate the performance data, indicating how the computer is operating, in response to monitoring execution of the application 110. The agent 112 may provide the performance data to the application monitoring system 116. Generation of the performance data may be discussed in more detail below. The application monitoring system 116 may process the performance data reported by the agent 112. In one or more embodiments, processing of the performance data may include providing resource usage and/or performance information to the user through the interface.

The database server 118 may process the requests from the application 110 of the application server 108. The database server 118 may be implemented as a database, another application server, and/or some other remote machine in communication with the application server 108. The database server may provide a service or may process the requests from the application on the application server 108. In one or more embodiments, the database server 118 may be implemented as a remote system that receives the request from the application, processes the request and provides the response to the application 110.

Figure 2:
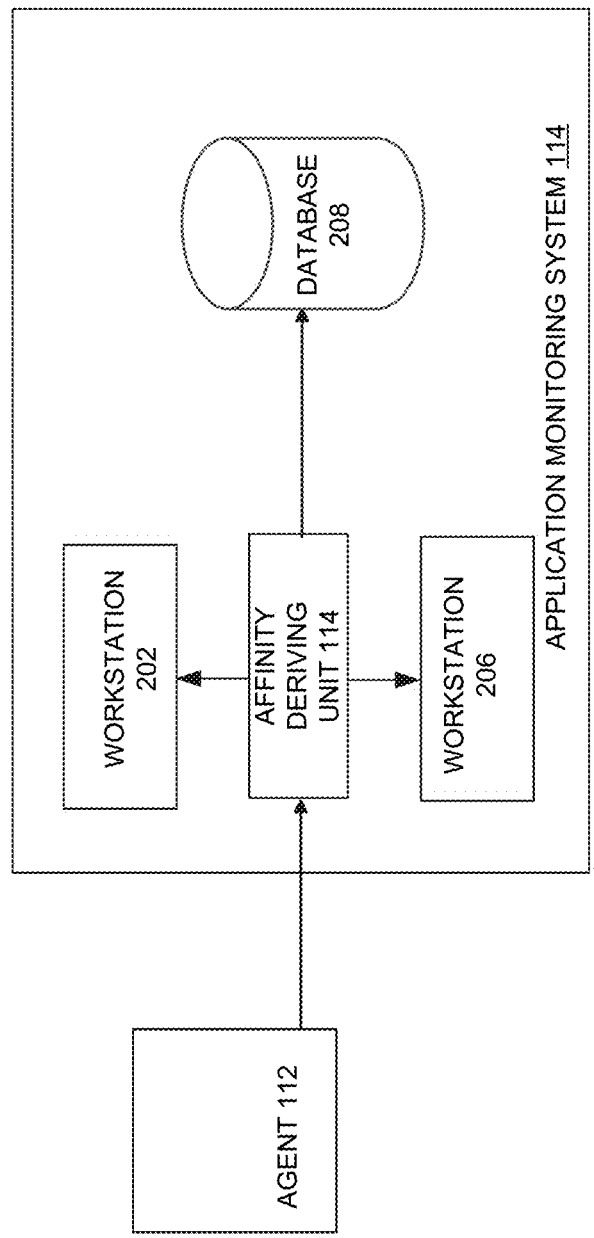
FIG. 2 shows application monitoring system of the consulting system, according to one embodiment.

FIG. 2 shows block diagram depicting a conceptual view of the components of the application monitoring system. The application 110 may communicate with the application monitoring system 116 via the agent 112.

In one or more embodiments, the application monitoring system 116 may use agent 112, considered as part of the application monitoring system 116, though illustrated as a separate block in FIG. 1. The application monitoring system 116 may include affinity deriving unit 114, database 208, workstation 202 and workstation 206. The agent 112 and the application monitoring system 116 may monitor the execution of one or more applications at the application server 108, generate performance data representing the execution of components of the application 110 responsive to the requests, and process the generated performance data. As the application 110 runs, the agent 112 may collect the data, processes and optionally summarizes the data, and sends it to the affinity deriving unit 114.

The affinity deriving unit 114 may receive the performance data from the application 110 via the agent 112. The affinity deriving unit 114 may run requested calculations, make the performance data available to the workstations (e.g. 202 and 206) and optionally sends the performance data to the database 208. Iteration period for deriving affinity band may be configured by the affinity deriving unit 114. The workstations 202 and 206 may include a graphical user interface for viewing the performance data. The workstations 202 and 206 may also be used to create custom views of the performance data that may be monitored by a human operator.

In example embodiment, the workstations 202 and 206 consist of two main windows: a console and an explorer. The console may display the performance data in a set of customizable views. The explorer may depict alerts and calculators that filter the performance data so that the data may be viewed in a meaningful way. The elements of the workstation that organize, manipulate, filter and display the performance data may include actions, alerts, calculators, dashboards, persistent collections, metric groupings, comparisons, smart triggers and/or simple network management protocol collections.

Figure 3:
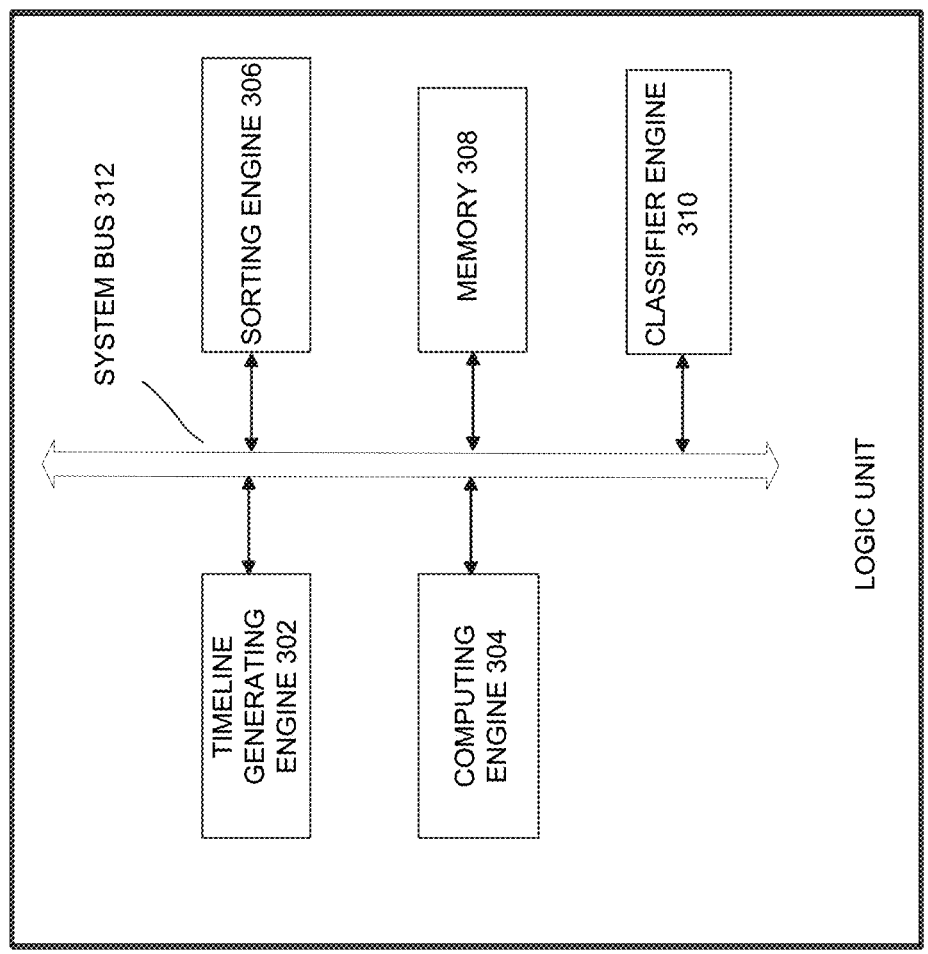
FIG. 3 shows affinity deriving unit of the consulting system in detail, according to one embodiment.

FIG. 3 shows the affinity deriving unit 114 of the application monitoring system 116. The affinity deriving unit 114 includes timeline generating engine 302, a computing engine 304, a sorting engine 306, a memory 308, and a classifier engine 310. The memory 308 stores, in part, instructions and data for execution by computing engine 304. If the system of the present invention, wholly or partially implemented in software, memory 308 may store the executable code when in operation. The components shown in FIG. 3 may be connected via a system bus 312. The affinity band may be derived by the affinity deriving unit 114 of the application monitoring system 116.

In an example embodiment, consider the performance of a software application as the response time for the user to login into the application or the response time of a transaction like transfer amount. Factors such as CPU and/or memory of servers hosting the application, number of sessions and/or connections on the application, network bandwidth may affect the performance of the application. In turn the response time of the transaction to get completed may be affected. Depending on the real-time conditions of the factors, the response time experienced by the user or the time taken by the application to provide response changes and varies.

For example, the response time for login may lie in the range of 0.5 sec to 5.2 sec. The performance of the application may be represented by a single number which may be usually taken as the average of all the response time values. The average by definition may be pulled towards higher values because of the summation, so if you have some high values then the average calculated turns out to be high. For instance, consider 10 values:

TABLE 1

Response time values

| 0.9 | 1 | 1.5 | 1.2 | 1.32 | 1 | 9 | 11 | 1 | 1.5 |

The average turns out to be 2.942 because there may be 2 high values but most of the values may be around 1 to 1.5. The average may fail to bring out the real behavior of the distribution of values. If the average may be taken as the benchmark, then the average may results in misleading representation of the range of actual values taken. Hence, the invention proposes a method to come up with the affinity mean which gives the value around which actual values may tend to cluster and the affinity band which may provide the range of values most likely taken.

In example embodiment, in case of application performance management, to enable better user experience, there may be SLAs defined to ensure performance. For example, in case of banking application for the money transfer transaction, the SLA set by the business may be 3 sec. The SLAs may have 2 different viewers: business and information technology (IT) infrastructure. The IT infrastructure may be required to ensure the business SLAs. If the IT threshold may be set at the business SLA then there may be room left for corrective and/or pro-active actions.

In the example of ten values as given above, if business SLA may be taken as the threshold (3 sec) then the average of those values may turn out to be 2.9 sec and the IT may still views the performance to be good. If the threshold may be taken to be the affinity means let's say 1.1 sec, then when the normal values start going above 1.1 sec, the IT may pro-actively take necessary actions to control and/or optimize the response time and stay well below the business SLA of 3 sec. Moreover, the reason for deviation of the response time from the normal range of 1-1.5 sec may give a heads-up to the IT as well as business that there may be a possibility of breaching the SLAs in future.

For example, the response time may start going beyond 1.5 sec when the number of concurrent users may go beyond 20 thousand and/or when the connection pool may be fully utilized, hence there may be a need to increase the pool size and threads. Thus, the affinity mean and affinity band may facilitate pro-active performance management before the SLAs may be breached. If one uses the normal average then alert may be raised after the SLA may be breached, failing to provide pro-active performance monitoring. Thus, the use of affinity mean and affinity band may bring about pro-active performance management by taking necessary corrective measures, when there may be tendency shown by the system to take values beyond the affinity bands.

In one or more embodiments, the affinity band may be derived by the affinity deriving unit 114 of the application monitoring system 116. The affinity deriving unit 114 may receive the performance data stored in database 208 of the application monitoring system 116. The timeline generating engine 302 of the affinity deriving unit 114 may determine individual raw values of the application response time with lowest and highest data values for each unit period. The lowest and highest data values may be sorted by sorting engine 306 of the affinity deriving unit 114 by dropping predefined or user defined percentage of lowest and highest data values. The average of lowest and highest data values may be computed by the computing engine 304 of the affinity deriving unit 114. The average of lowest and highest data values so far computed may be divided into predefined equal parts. Each of the equal part so divided may be classified for the response time bucketing by the classifier engine 310.

The computing engine 304 may identify frequency of the response time for each of the intervals. The frequency of the response time for each of the intervals may provide the response time distribution along with the affinity band. The predefined percentage of lowest and highest data values of the response time may be removed by the computing engine 304 for each unit period. Average and standard deviation of the remaining mid data values of the response time for each unit period may be computed by the computing engine 304.

The affinity band may be derived using the average and standard deviation of the remaining mid data values of the response time for each unit period by the computing engine 304. Lower and upper range of the affinity band may correspond to the zone where the response times may tend to assume most values. The lower and upper range of the affinity band may be determined by deriving the affinity band. The average of the remaining mid data values of the response time for each unit period may determine the affinity mean. The affinity mean may be regarded as the representative value around which the other values may tend to cluster. The affinity band and affinity mean may be used in pro-active performance management of the application.

Figure 4:
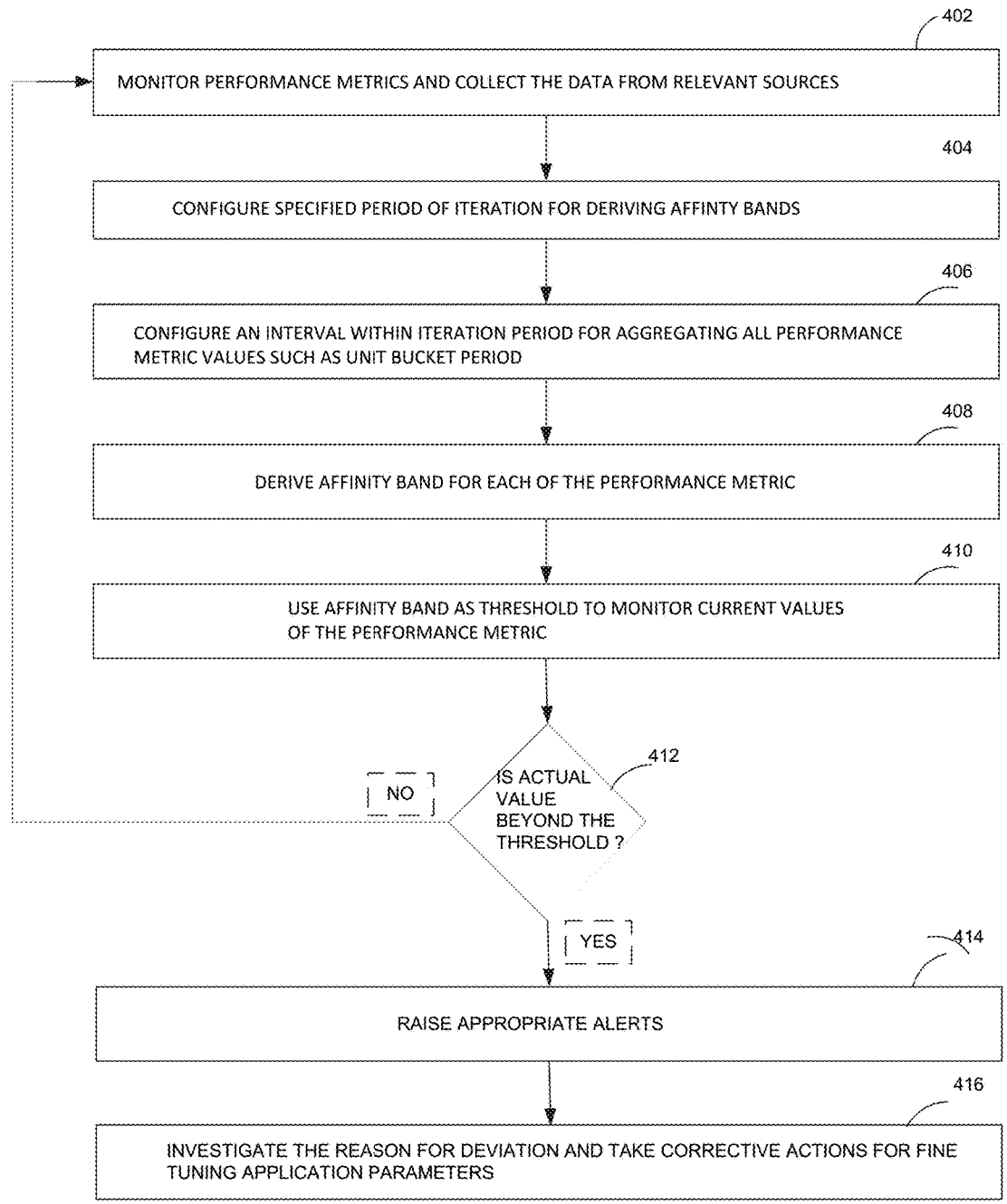
FIG. 4 shows process flow diagram of the consulting system, according to one embodiment.

FIG. 4 shows process flow diagram of pro-active performance management of the application using the affinity band. The process flow diagram begins with monitoring performance metrics and collecting the data from relevant sources 402, configuring iteration period for deriving affinity band 404, configuring an interval within the iteration period for aggregating the performance metrics such as unit bucket period 406, deriving the affinity band for each of the performance metrics 408, monitoring current values of the performance metric using the affinity band as threshold 410, determining if the current values of the performance metric go beyond the threshold 412, if yes then raising appropriate alerts 414, and investigating cause of deviation with appropriate corrective actions to fine tune application parameters 416.

In example embodiment, for each of the performance metrics, for the data gathered, the affinity band may be derived using the procedure described above. For instance, consider performance metric of login response time in milliseconds and the period of iteration as 1 month and unit bucket as 1 day.

Figure 5:
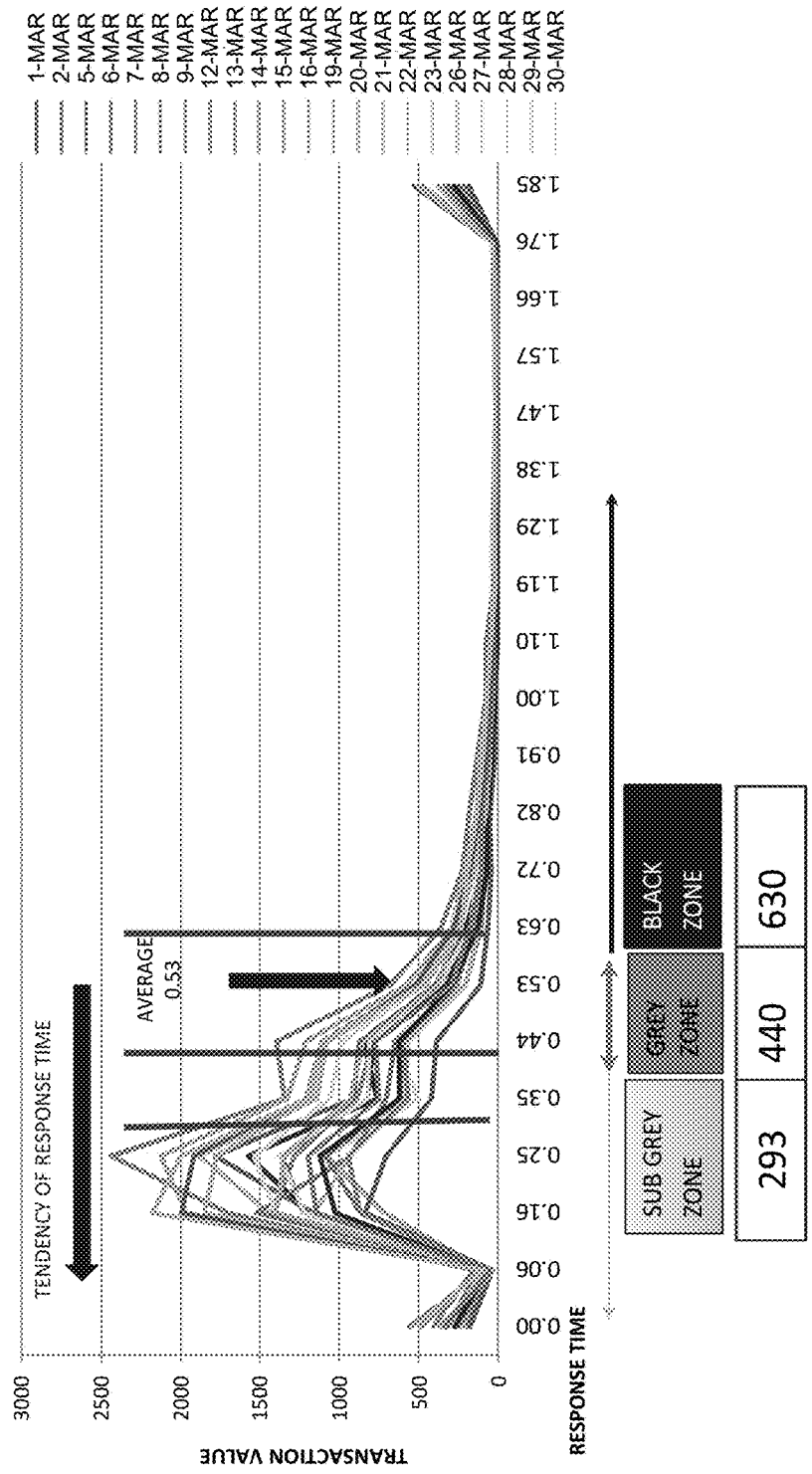
FIG. 5 shows monitoring mechanism display illustrating response time distribution of the performance metric, according to one or more embodiments.

FIG. 5 shows the distribution of the response time for each unit bucket (1 day) over the iteration period (1 month). Consider a monitoring unit interval based on the volume and frequency of performance metric under consideration for monitoring using the affinity bands. The monitoring unit may be 10 sec, 1 minute, 5 minute, and/or 1 hour subject to the dynamics of the application and the underlying IT infrastructure. One may infer from FIG. 5 that most of the times the response time values may fall in the band of 150-440 milliseconds (ms). The affinity band may be referred to as the band where the response times may be clustered. The affinity band may depend on the activities/code in the transaction, server responses and may be characteristic to given conditions.

In the one or more embodiments, the alerting mechanism may be a band showing counts of values in the 3 bands based on the affinity bands instead of binary yes or no. For each monitoring unit interval, there may be a sub-divided bar giving the volumes of actual metric values in each band as defined by the affinity bands. The advantage with the affinity band may be alerting and pro-active performance management. Based on the affinity band one may set the normal range to be the grey zone and may define dark grey and black zones to indicate the tendency to take values around the affinity band, start rising above the affinity band and way further from the affinity band. As an illustration for the example above consider the table below with the metric values and affinity bands,

TABLE 2 showing metric values with affinity band

| DESCRIPTION | ms | BAND | COMMENT |
|---|---|---|---|
| Response times under | 290 | Sub-light grey | Normal tendency band |
| Response time until | 440 | Grey | Limit of affinity band |
| Response times above | 440 | Dark grey | Moving beyond affinity band |
| Response times above | 620 | Black | To be regarded as deviated from normal and trigger for investigation |

The value used to represent the response times may be the aggregate average of all response times and turns out to be around 530 ms for days in March under consideration as shown in FIG. 5. One may infer that using the aggregate average fail to correctly represent the behavior of the responses. The aggregate average may suggest that the response times may be around 530 ms whereas practically, the response time may fall in the band of 150-440 ms. The objective of the affinity mean proposed in the present invention may be to represent the average of the values around which the response times may tend to assume values.

Figure 6:
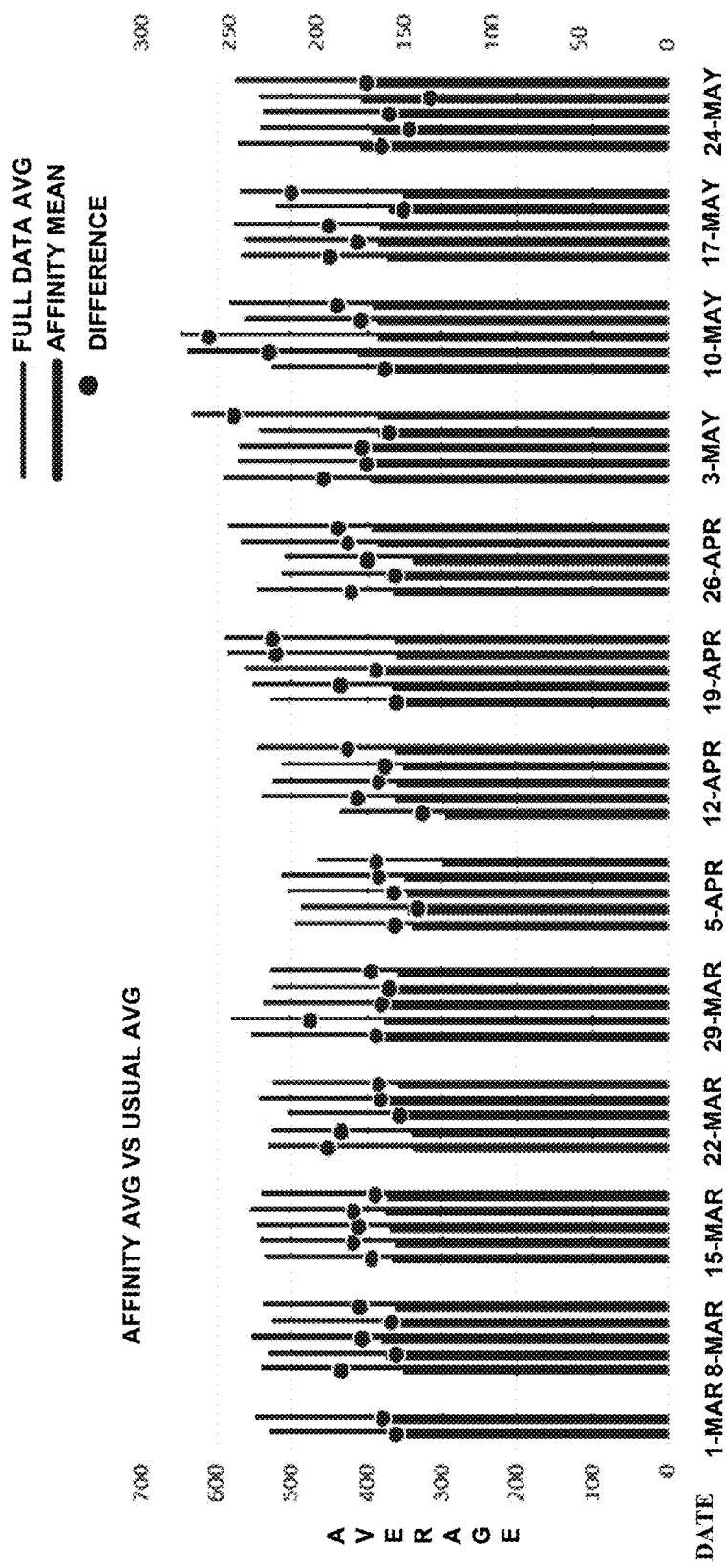
FIG. 6 shows chart plotting usual aggregate versus affinity average of the performance metric, according to one or more embodiments.

FIG. 6 shows chart plotting the usual aggregate average and the affinity average for days over 3 months as bar chart on primary Y-axis and the difference in the values as dots on secondary Y-axis. One may observe that the affinity mean values may be around 370 ms, the aggregate average values around 545 ms. The difference of 175 ms may indicate that the usual average may be almost 40% higher than what the actual tendency may be. Thus, the affinity mean may be a better measure of the actual values taken in execution while providing a better representation of the response time behavior.

Figure 7:
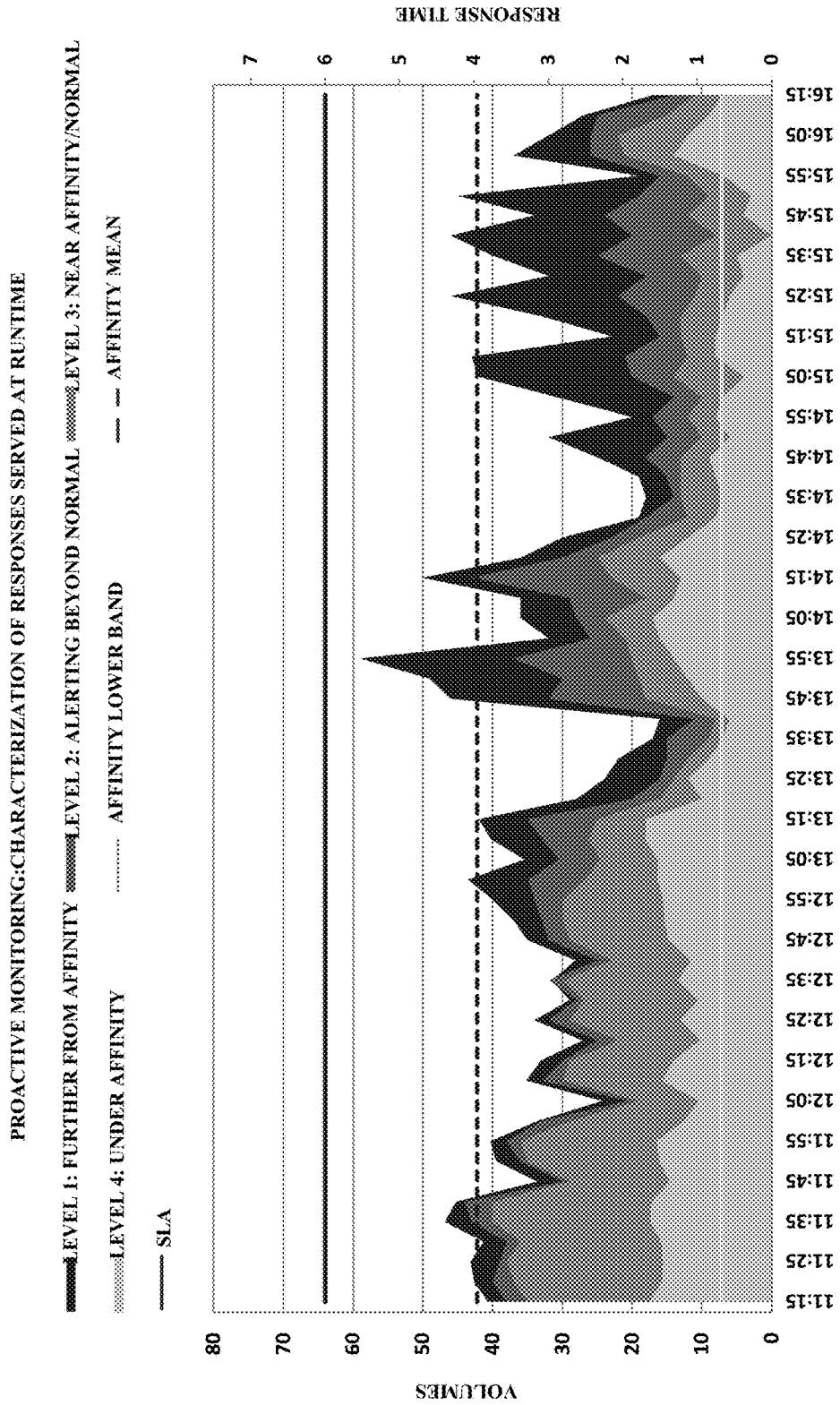
FIG. 7 shows monitoring mechanism display illustrating execution of transaction and affinity status response time, according to one or more embodiments.

FIG. 7 shows monitoring mechanism display. The display may be illustrated as follows: x-axis showing the time and y-axis showing the volumes of metric values in different bands. The monitoring mechanism may bring out the tendency to rise or move beyond the normal values and the extent of deviation. The monitoring mechanism may trigger pro-active action and investigate the cause of abnormal behavior. For instance, consider the monitoring unit interval to be 15 minutes, then clearly the abnormal behavior may be reflected around 15:00 hours. The pro-active action may lead to investigating the reason for deviation and the parameters that led to threshold violation. The corrective action for fine tuning the application parameters such as available CPU memory, provision of new instances may be taken.

Based on the threshold, one may pro-actively monitor the performance and have ability to investigate real time before the degradation worsens and SLAs may be breached. FIG. 7 shows the count of execution instances of the transactions and affinity status of the response time. The sub-light grey zone shows the transactions within the affinity band, black zone shows the volume of transactions well beyond the affinity band. The sign of good performance may be having high volumes in the sub-light grey zone while a thick black band may bring out early indications of response times showing abnormal behavior i.e. signs of poor performance. Quick investigations/actions may arrest the poor performance and early initiatives before the SLAs may be breached.

In order to have an effective mechanism of proactive monitoring and alerting, it may be crucial to have 1) better threshold and 2) instead of single threshold breach, requires zone which may bring about the tendency or progression towards potential breach of threshold. The existing tools lack both of the crucial factors. The proposed solution addresses both of the crucial factors. The proposed solution may come up with affinity mean as single threshold and by deriving the affinity bands to bring about the progression or tendency towards deviating from the normal behavior.

In one or more embodiments, the affinity mean may be used as single value threshold to set the alert or the affinity bands to bring out the rising conduct. Consider an instance, when the monitoring unit intervals may be large, the affinity mean may be used and the affinity bands may be two colored or binary with the conventional under-above distinction. The affinity mean threshold may serve better threshold since it gives clustering tendency value and any shift in the clustering pattern may be noticed.

The affinity mean may be used as a benchmark for a larger scenario such as release. If the business may wish to check the impact of changes over releases, then the affinity mean may be the best measure to represent the performance of the whole release behavior as a single number. The affinity mean value may provide the degradation or improvements over the releases for a particular application. The affinity mean may also bring about the headroom available for the performance to degrade further. If the releases show rising trends on affinity mean, facilitating pro-active actions which may be either (a) providing more IT infrastructure or (b) tune the application code to bring about performance improvements or (c) give heads up to business about the inability to meet the SLAs and negotiate the SLA in view of appropriate reasons responsible for the possible future violations or (d) a combination of the 3 options as above.

Figure 8:
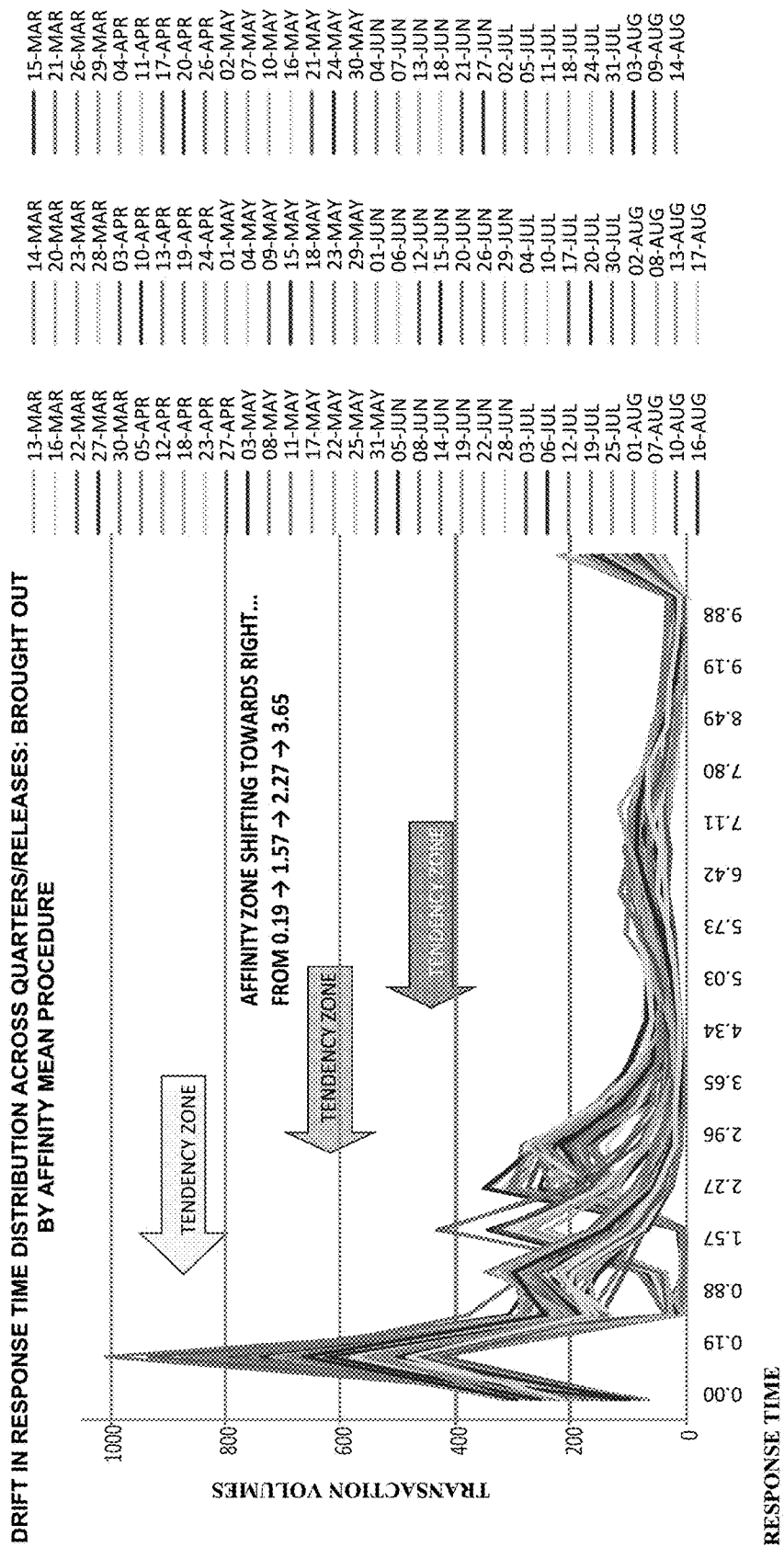
FIG. 8 shows monitoring mechanism display illustrating graphical representation of response time distributions across two quarters.

FIG. 8 shows monitoring mechanism display illustrating graphical representation of response time distributions across two quarters involving production releases in that period as obtained by affinity mean procedure. According to one or more embodiments and as shown by the graph, affinity zone is clearly shifting towards right or higher response times (from 0.19 sec to 3.65 sec).

Figure 9:
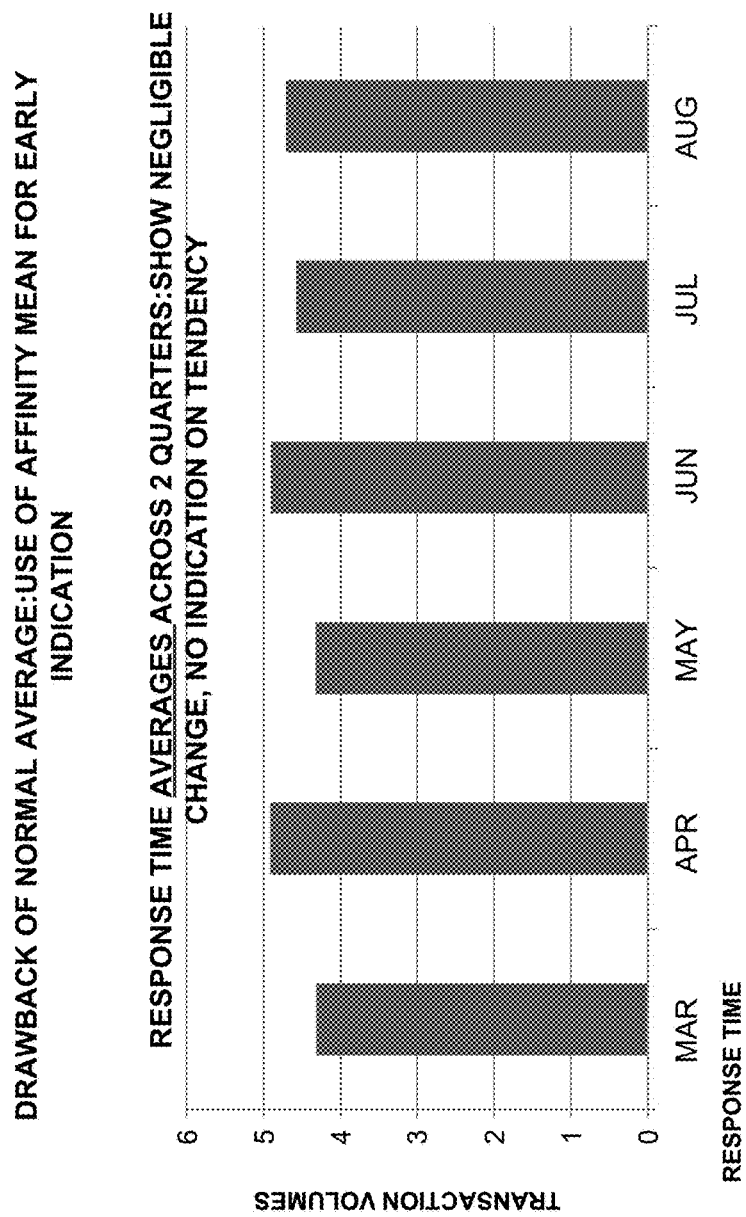
FIG. 9 shows a chart giving usual averages for the same period of data across two quarters, according to one or more embodiments.

FIG. 9 shows a chart giving usual averages for the same period of data as in FIG. 8 and the table below giving affinity mean for the same data, according to one or more embodiments. Table 3 shows affinity mean rising. As seen in the graph, there is no noticeable change in the usual averages for the months under consideration, nor do the usual averages indicate any tendency (of rising).

TABLE 3 illustrates affinity mean clearly bringing out the rising tendency

| Month | Affinity lower band | Affinity Mean | Affinity upper band | Normal Average |
|---|---|---|---|---|
| March | 0.671 | 3.956 | 8.451 | 4.315 |
| April | 0.662 | 3.762 | 8.015 | 4.912 |
| May | 0.651 | 3.871 | 8.201 | 4.323 |
| June | 1.333 | 4.654 | 8.35 | 4.906 |
| July | 1.34 | 4.41 | 8.263 | 4.575 |
| August | 1.455 | 4.867 | 8.526 | 4.709 |

Figure 10:
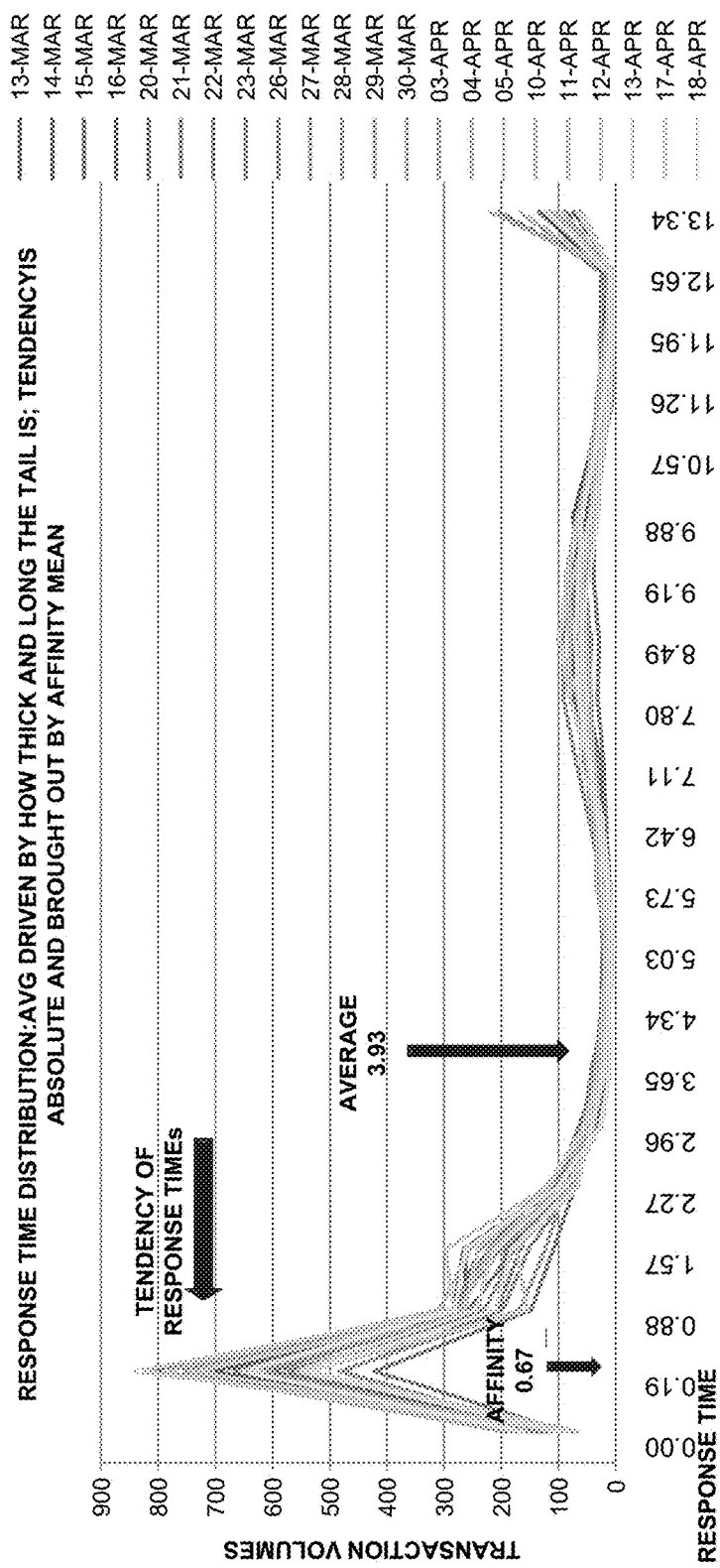
FIG. 10 shows monitoring mechanism display illustrating tendency of response times and giving the usual averages, according to one or more embodiments.

FIG. 10 shows monitoring mechanism display illustrating tendency of response times and giving the usual averages, according to one or more embodiments. As seen in the graph, usual average is driven by how long and thick the tail is, while the tendency is absolute and brought out by affinity mean.

Figure 11:
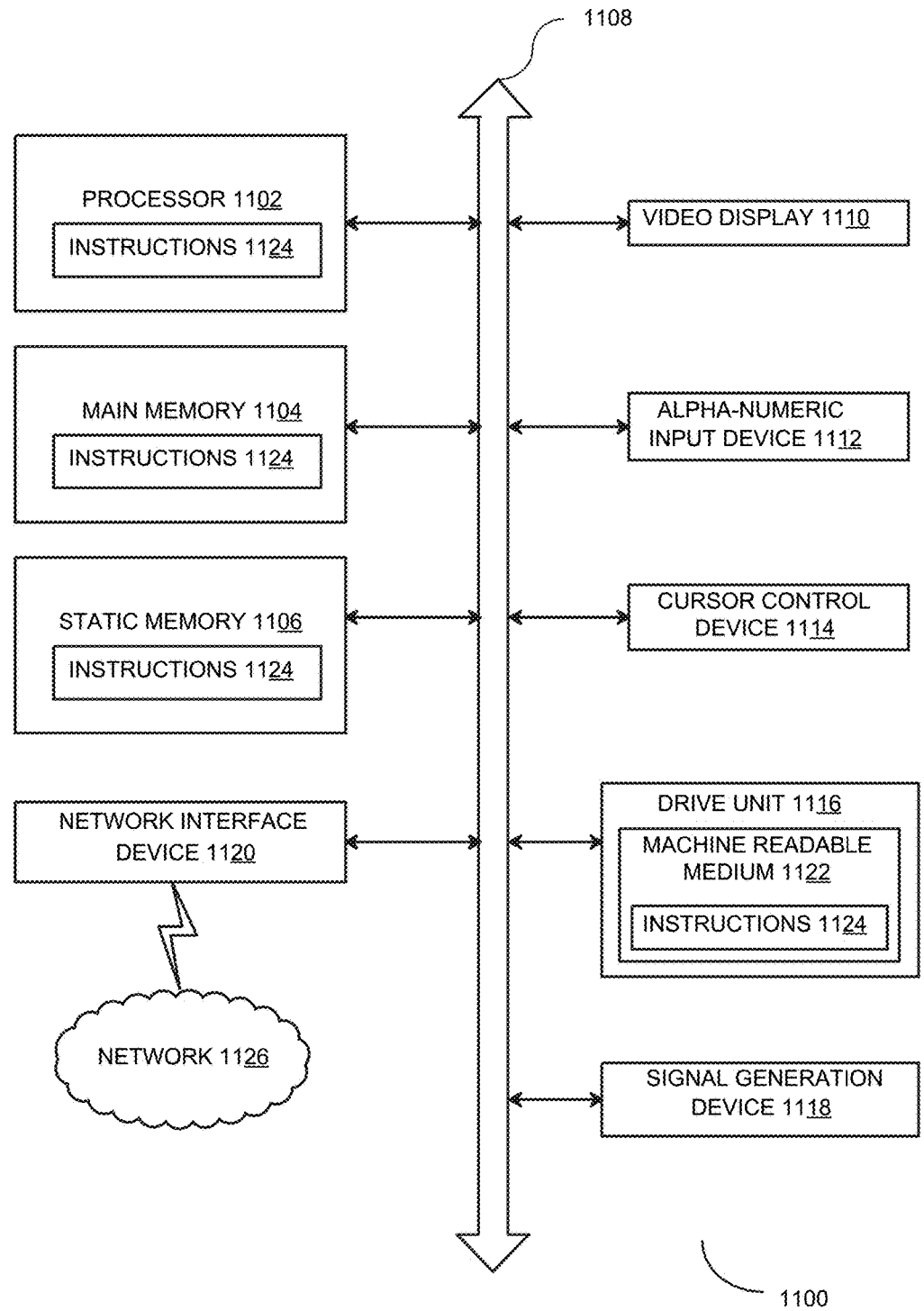
FIG. 11 shows data processing system, according to one or more embodiments.

FIG. 11 shows diagrammatic representation of a data processing system capable of processing a set of instructions to perform any one or more of the methodologies herein, according to an example embodiment. FIG. 11 shows a diagrammatic representation of machine in the example form of a computer system 1100 within which a set of instructions, for causing the machine to perform any one or more of the methodologies discussed herein, may be executed. In various embodiments, the machine operates as a standalone device and/or may be connected (e.g., networked) to other machines. In a networked deployment, the machine may operate in the capacity of a server and/or a client machine in server-client network environment, and or as a peer machine in a peer-to-peer (or distributed) network environment. The machine may be a personal-computer (PC), a tablet PC, a set-top box (STB), a Personal Digital Assistant (PDA), a cellular telephone, a web appliance, a network router, switch and or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 1100 includes a processor 1102 (e.g., a central processing unit (CPU) a graphics processing unit (GPU) and/or both), a main memory 1104 and a static memory 1106, which communicate with each other via a bus 1108. The computer system 1100 may further include a video display unit 1110 (e.g., a liquid crystal displays (LCD) and/or a cathode ray tube (CRT)). The computer system 1100 also includes an alphanumeric input device 1112 (e.g., a keyboard), a cursor control device 1114 (e.g., a mouse), a disk drive unit 1116, a signal generation device 1118 (e.g., a speaker) and a network interface device 1120.

The disk drive unit 816 includes a machine-readable medium 1122 on which is stored one or more sets of instructions 1124 (e.g., software) embodying any one or more of the methodologies and/or functions described herein. The instructions 824 may also reside, completely and/or at least partially, within the main memory 1104 and/or within the processor 1102 during execution thereof by the computer system 1100, the main memory 1104 and the processor 1102 also constituting machine-readable media.

The instructions 1124 may further be transmitted and/or received over a network 1126 via the network interface device 1120. While the machine-readable medium 1122 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and carrier wave signal.

What is claimed is:

1. A non-transitory computer readable medium having computer executable instructions stored thereon, said instructions control at least one processor to implement a method for monitoring an application associated with one or more transactions, proactively alerting an upward trend of application response time of the one or more transactions so as to trigger corrective measures to improve operating efficiency of the application, the method comprising:

deriving, by a processor, performance data from monitoring the application over an iteration period, wherein the performance data comprises application response time of one or more transactions and context data describing conditions under which the one or more transactions are performed, wherein the context data comprises throughput during a time period;

receiving, via an agent of an application monitoring system executed by the processor, the performance data;

dividing the iteration period into a sequence of unit periods;

determining, via an affinity deriving unit of the application monitoring system executed by the processor, an affinity mean and an affinity band for each unit period;

identifying a distribution of application response times within each unit period;

for each unit period, via the application monitoring system, assigning the application response time of each transaction into one of a plurality of zones defined by the affinity band and tracking a volume of transactions in each of the plurality of zones;

displaying the volume of transactions in each of the plurality of zones during the iteration period in a graphical user interface of the application monitoring system;

for each unit period, presenting the affinity mean, the affinity band, the distribution of the application response times, and the volume of transactions in each of the plurality of zones in the graphical user interface;

monitoring in the graphical user interface the application response time;

automatically generating an alert for a sign of poor performance by the application monitoring system when the application response time exceeds the affinity mean;

monitoring in the graphical user interface the volume of transactions in each of the plurality of zones; and automatically generating a second alert by the application monitoring system when the volume of transactions in a zone that is beyond the affinity band exceeds a predefined limit;

wherein the act of determining the affinity mean and the affinity band comprises:

determining, via a timeline generating engine, individual application response times in the unit period;

sorting, via a sorting engine, the application response times in the unit period;

determining, via a computing engine, lowest application response times, highest application response times, and mid-range application response times between the lowest application response times and the highest application response times;

determining, via the computing engine, the affinity mean as an average of the mid-range application response times; and determining, via the computing engine, the affinity band based on the affinity mean and standard deviation of the mid-range application response time;

wherein the act of identifying the distribution of the application response times comprises:

determining, via the computing engine, an average of the lowest application response times and an average of the highest application response times;

dividing, via the computing engine, an interval between the average of the lowest application response times and the average of the highest application response times into a predefined number of equal buckets;

classifying, via a classifier engine, each application response time into a corresponding bucket; and generating, via the computing engine coupled to the classifier engine, a distribution of the application response times across the predefined number of equal buckets.

2. The non-transitory computer readable medium of claim 1, wherein the one or more transactions are performed to process requests transmitted to the application.

3. The non-transitory computer readable medium of claim 1, wherein the method further comprises:

deriving threshold and service level agreement for the application response time.

4. The non-transitory computer readable medium of claim 3, wherein the service level agreement is set for a number of transactions in an automated manner.

5. A method for monitoring an application associated with one or more transactions, proactively alerting an upward trend of application response time of the one or more transactions so as to trigger corrective measures to improve operating efficiency of the application, the method comprising:

deriving, by a processor, performance data from monitoring the application over an iteration period, wherein the performance data comprises application response time of one or more transactions and context data describing conditions under which the one or more transactions are performed, wherein the context data comprises throughput during a time period;

receiving, via an agent of an application monitoring system executed by the processor, the performance data;

dividing the iteration period into a sequence of unit periods;

determining, via an affinity deriving unit of the application monitoring system executed by the processor, an affinity mean and an affinity band for each unit period;

identifying a distribution of the application response times within each unit period;

for each unit period, via the application monitoring system, assigning the application response time of each transaction into one of a plurality of zones defined by the affinity band and tracking a volume of transactions in each of the plurality of zones;

displaying the volume of transactions in each of the plurality of zones during the iteration period in a graphical user interface of the application monitoring system;

for each unit period, presenting the affinity mean, the affinity band, the distribution of the application response times, and the volume of transactions in each of the plurality of zones in the graphical user interface;

monitoring in the graphical user interface the application response time;

automatically generating an alert for a sign of poor performance by the application monitoring system when the application response time exceeds the affinity mean;

monitoring in the graphical user interface the volume of transactions in each of the plurality of zones; and automatically generating a second alert by the application monitoring system when the volume of transactions in a zone that is beyond the affinity band exceeds a predefined limit;

wherein the act of determining the affinity mean and the affinity band comprises:

determining, via a timeline generating engine, individual application response times in the unit period;

sorting, via a sorting engine, the application response times in the unit period;

determining, via a computing engine, lowest application response times, highest application response times, and mid-range application response times between the lowest application response times and the highest application response times;

determining, via the computing engine, the affinity mean as an average of the mid-range application response times; and determining, via the computing engine, the affinity band based on the affinity mean and standard deviation of the mid-range application response time;

wherein the act of identifying the distribution of the application response times comprises:

determining, via the computing engine, an average of the lowest application response times and an average of the highest application response times;

dividing, via the computing engine, an interval between the average of the lowest application response times and the average of the highest application response times into a predefined number of equal buckets;

classifying, via a classifier engine, each application response time into a corresponding bucket; and generating, via the computing engine coupled to the classifier engine, a distribution of the application response times across the predefined number of equal buckets.

6. The method of claim 5, wherein the one or more transactions are performed to process requests transmitted to the application.

7. The method of claim 5, further comprising:
deriving threshold and service level agreement for the application response time.

8. The method of claim 7, wherein the service level agreement is set for a number of transactions in an automated manner.

9. The method of claim 5, further comprising:
integrating pro-active application monitoring with existing monitoring solutions and products to set appropriate alerts, provide benchmark reports and configure service level agreements.

10. The method of claim 5, further comprising:
enhancing business intelligence provided by monitoring tools.

11. The method of claim 5, further comprising:
deriving performance metrics including throughputs, queue length, resource consumption, database characteristics and availability parameters.

12. The method of claim 5, wherein application monitoring is applied in at least one of an application performance monitoring tools, non-functional requirement relating to application response time and volume of transactions, benchmarking performance, performance comparison across releases and pro-active application performance management.

13. The method of claim 5, wherein the context data further comprises error rate and concurrency experienced for the one or more transactions during the time period.

14. A system for monitoring an application associated with one or more transactions, proactively alerting an upward trend of application response time of the one or more transactions so as to trigger corrective measures to improve operating efficiency of the application, the system comprising:
a communication interface;
a storage device;
one or more processors in communication with the communication interface and the storage device, the one more processors adapted to:
derive performance data from monitoring the application over an iteration period, wherein the performance data comprises application response time of one or more transactions and context data describing conditions under which the one or more transactions are performed, wherein the context data comprises throughput during a time period;
receive via an agent of an application monitoring system the performance data;
divide the iteration period into a sequence of unit periods;
determine, via an affinity deriving unit of the application monitoring system, an affinity mean and an affinity band for each unit period;
identify a distribution of the application response times within each unit period;

for each unit period, via the application monitoring system, assign the application response time of each transaction into one of a plurality of zones defined by the affinity band and track a volume of transactions in each of the plurality of zones;

display the volume of transactions in each of the plurality of zones during the iteration period in a graphical user interface of the application monitoring system;

for each unit period, present the affinity mean, the affinity band, the distribution of the application response times, and the volume of transactions in each of the plurality of zones in the graphical user interface; and monitor in the graphical user interface the application response time;

automatically generate an alert for a sign of poor performance by the application monitoring system when the application response time exceeds the affinity mean;

monitor in the graphical user interface the volume of transactions in each of the plurality of zones;

automatically generate a second alert by the application monitoring system when the volume of transactions in a zone that is beyond the affinity band exceeds a predefined limit;

wherein the act of determining the affinity mean and the affinity band comprises:

determining, via a timeline generating engine, individual application response times in the unit period;

sorting, via a sorting engine, the application response times in the unit period;

determining, via a computing engine, lowest application response times, highest application response times, and mid-range application response times between the lowest application response times and the highest application response times;

determining, via the computing engine, the affinity mean as an average of the mid-range application response times; and determining, via the computing engine, the affinity band based on the affinity mean and standard deviation of the mid-range application response time;

wherein the act of identifying the distribution of the application response times comprises:

determining, via the computing engine, an average of the lowest application response times and an average of the highest application response times;

dividing, via the computing engine, an interval between the average of the lowest application response times and the average of the highest application response times into a predefined number of equal buckets;

classifying, via a classifier engine, each application response time into a corresponding bucket; and generating, via the computing engine coupled to the classifier engine, a distribution of the application response times across the predefined number of equal buckets.

15. The system of claim 14, wherein the one or more processors are configured to derive threshold and service level agreement for the application response time.

16. The system of claim 15, wherein the service level agreement is set for a number of transactions in an automated manner.

17. The system of claim 14, further comprising: integrating with existing monitoring solutions and products to set appropriate alerts, providing benchmark reports and configuring service level agreements.

18. The system of claim 14, further comprising:
enhancing business intelligence provided by monitoring tools; and
deriving performance metrics comprising throughputs, queue length, resource consumption, database characteristics, and availability parameters.

19. The system of claim 14, wherein the application monitoring is applied in at least one of an application performance monitoring tools, non-functional requirement relating to application response time and volume of transactions, benchmarking performance, performance comparison across releases and pro-active application performance management.

20. The system of claim 14, wherein the context data further comprises error rate and concurrency experienced for the one or more transactions during the time period.

\* \* \* \* \*